United States Patent
Lee et al.

(10) Patent No.: US 9,284,405 B2
(45) Date of Patent: *Mar. 15, 2016

(54) PREPARATION METHOD OF POLYESTER RESIN

(71) Applicant: SK CHEMICALS CO., LTD., Gyeonggi-do (KR)

(72) Inventors: Yoo Jin Lee, Gyeonggi-do (KR); Ji-Hyun Kim, Gyeonggi-do (KR); Jong Ryang Kim, Gyeonggi-do (KR)

(73) Assignee: SK CHEMICALS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/403,639

(22) PCT Filed: May 21, 2013

(86) PCT No.: PCT/KR2013/004451
§ 371 (c)(1),
(2) Date: Nov. 25, 2014

(87) PCT Pub. No.: WO2013/176467
PCT Pub. Date: Nov. 28, 2013

(65) Prior Publication Data
US 2015/0141612 A1    May 21, 2015

(30) Foreign Application Priority Data

May 25, 2012  (KR) .......................... 10-2012-0056282

(51) Int. Cl.
| | |
|---|---|
| C08G 63/00 | (2006.01) |
| C08G 63/83 | (2006.01) |
| C08G 63/183 | (2006.01) |
| C08G 63/672 | (2006.01) |
| C08G 63/91 | (2006.01) |
| C08G 63/199 | (2006.01) |
| C08G 63/86 | (2006.01) |
| C08G 67/00 | (2006.01) |

(52) U.S. Cl.
CPC .............. *C08G 63/83* (2013.01); *C08G 63/183* (2013.01); *C08G 63/199* (2013.01); *C08G 63/672* (2013.01); *C08G 63/863* (2013.01); *C08G 63/916* (2013.01)

(58) Field of Classification Search
CPC .................................................. C08G 63/866
USPC ........................................ 528/271, 272, 281
See application file for complete search history.

(56) References Cited

U.S. PATENT DOCUMENTS

| | | | |
|---|---|---|---|
| 5,674,801 | A | 10/1997 | George |
| 2004/0092703 | A1 | 5/2004 | Germroth et al. |
| 2005/0008885 | A1 | 1/2005 | Blakely et al. |
| 2007/0149757 | A1 | 6/2007 | Nakajima et al. |
| 2011/0269933 | A1* | 11/2011 | Park et al. ................... 528/286 |

FOREIGN PATENT DOCUMENTS

| | | |
|---|---|---|
| CN | 1961022 | 5/2007 |
| EP | 0550034 | 7/1993 |
| EP | 1593702 | 11/2005 |
| JP | 10-279676 | 10/1998 |
| JP | 2005-120254 | 5/2005 |
| KR | 10-0181687 | 5/1999 |
| KR | 10-2000-0019013 A | 4/2000 |
| KR | 10-0562462 | 2/2001 |
| KR | 10-2002-0087424 A | 11/2002 |
| KR | 10-2004-0036045 | 4/2004 |
| KR | 10-2004-0083544 | 10/2004 |
| KR | 10-2007-0012471 A | 1/2007 |
| KR | 10-2011-0028696 A | 3/2011 |
| WO | WO 2011/031112 | 3/2011 |
| WO | WO 2012-007958 A1 | 1/2012 |

OTHER PUBLICATIONS

International Search Report prepared by the Korean Patent Office on Aug. 23, 2013, for International Application No. PCT/KR2013/004451.

Extended European Search Report for European Patent Application No. 13793953.4, dated Jan. 12, 2016, 6 pages.

* cited by examiner

*Primary Examiner* — Terressa Boykin
(74) *Attorney, Agent, or Firm* — Sheridan Ross P.C.

(57) ABSTRACT

The present invention provides a polyester resin including: moieties of dicarboxylic acid components including terephthalic acid; and moieties of diol components including isosorbide, a cyclohexanedimethanol, and the balance of other diol compounds. The polyester resin contains a zinc-based catalyst and a phosphorus-based stabilizer. The present invention also provides a method for preparing the polyester resin. The method includes: esterifying diol components including isosorbide, a cyclohexanedimethanol, and the balance of other diol compounds, with dicarboxylic acid components including terephthalic acid in the presence of an esterification reaction catalyst including a zinc compound; adding a phosphorus-based stabilizer to the esterification reaction mixture at the time when the degree of esterification reaches at least 80%; and subjecting the esterification reaction product to polycondensation.

14 Claims, No Drawings

PREPARATION METHOD OF POLYESTER RESIN

CROSS REFERENCE TO RELATED APPLICATIONS

This application is a national stage application under 35 U.S.C. 371 and claims the benefit of PCT Application No. PCT/KR2013/004451 having an international filing date of May 21, 2013, which designated the United States, which PCT application claimed the benefit of Korean Patent Application No. 10-2012-0056282 filed May 25, 2012, the disclosure of both the above-identified applications are incorporated herein by reference.

TECHNICAL FIELD

The present invention relates to a method for preparing a polyester resin. More specifically, the present invention relates to a polyester resin that exhibits excellent physical properties such as high resistance to heat, chemicals, and impact, and has excellent appearance properties, high transparency, and superior molding characteristics, and a method for preparing the polyester resin.

BACKGROUND OF THE ART

Generally, polyester resins are prepared from aromatic and aliphatic dicarboxylic acids and alkylene glycols having an optimum structure. Polyester resins have excellent physical and chemical properties, are highly soluble in general solvents, are highly flexible, possess good adhesion to a broad range of materials, have good coating workability, etc. Due to these advantages, polyester resins are used in various applications, such as for fibers, films, and adhesives.

In the preparation of a polyester resin, the proportions of raw materials present in the main chain of the final polyester resin varies depending on the reactivity of the raw materials during esterification or transesterification and on the degree of vaporization of the raw materials during polycondensation. Since the reactivity of diol components, typified by alkylene glycols, decreases in the order of primary diols>secondary diols>tertiary diols, the residual rate of diol components in polyester main chains decreases in this order. For this reason, when it is intended to synthesize a polyester resin using a secondary or tertiary alcohol, a sufficiently long reaction time is required or a very low reaction yield is obtained.

A method for synthesizing a polyester resin using an alcohol such as 1,4-cyclohexanedimethanol or isosorbide as a reactant has been known in recent years. According to this method, however, the use of the secondary alcohol makes it difficult to achieve a high reaction yield and a markedly improved degree of polymerization of the resin. That is, when isosorbide is used for the purpose of increasing the physical properties (e.g., heat resistance) of the resin, a low degree of polymerization is caused or an excessively large amount of the raw materials remain without participating in the reaction. As a result, the final polyester resin may have problems of low impact resistance or durability and very poor appearance properties.

On the other hand, it is known that various forms of metals or metal oxides can be used as catalysts for an esterification or transesterification reaction. An example of such catalysts is antimony oxide dissolved in a glycol solution. However, the use of the antimony compound brings about the formation of an insoluble antimony complex that clogs spinnerets in the resin preparation process. As a result, frequent stoppages of work are caused during resin spinning or continuous washing of the spinnerets is required.

Currently, environmental pressures and legal regulations regarding plastic resins are steadily on the rise. It is particularly important to determine whether plastic resins (such as food packaging containers) in direct contact with food contain compounds harmful to humans.

Furthermore, some already known polyester resins do not substantially lose their viscosity during hot extrusion, making it difficult to mold into final products with a uniform thickness or to manufacture large-volume or large-area products.

Thus, there is a need to develop a method for preparing a polyester resin with improved physical properties, excellent appearance properties, and good moldability into the final product, by which the efficiency of the polymerization reaction and the residual rate of raw materials in the final product can be increased.

DETAILED DESCRIPTION OF THE INVENTION

Technical Objectives

It is one object of the present invention to provide a polyester resin that exhibits excellent physical properties such as high resistance to heat, chemicals, and impact, and has excellent appearance properties, high transparency, and superior molding characteristics.

It is another object of the present invention to provide a method for preparing the polyester resin with the above-described characteristics, by which reactants are allowed to react with high efficiency in a short time.

Technical Solutions

The present invention provides a polyester resin including: moieties of dicarboxylic acid components including terephthalic acid; and moieties of diol components including 5 to 60 mole % of isosorbide, 10 to 80 mole % of a cyclohexanedimethanol, and the balance of other diol compounds, wherein the polyester resin contains 1 to 100 ppm of a zinc-based catalyst, in terms of the central metal atom content, based on the total amount of the resin, and 10 ppm to 300 ppm of a phosphorus-based stabilizer.

The present invention also provides a method for preparing the polyester resin, including: esterifying diol components including 5 to 60 mole % of isosorbide, 10 to 80 mole % of a cyclohexanedimethanol, and the balance of other diol compounds, with dicarboxylic acid components including terephthalic acid in the presence of an esterification reaction catalyst including a zinc compound; adding a phosphorus-based stabilizer to the esterification reaction mixture at the time when the degree of esterification reaches at least 80%; and subjecting the esterification reaction product to polycondensation.

A polyester resin and a preparation method thereof according to specific embodiments of the invention will now be described in more detail.

According to one embodiment of the invention, a polyester resin may include: moieties of dicarboxylic acid components including terephthalic acid; and moieties of diol components including 5 to 60 mole % of isosorbide, 10 to 80 mole % of a cyclohexanedimethanol, and the balance of other diol compounds, wherein the polyester resin contains 1 to 100 ppm of a zinc-based catalyst, in terms of the central metal atom content, based on the total amount of the resin and 10 ppm to 300 ppm of a phosphorus-based stabilizer.

The present inventors conducted research on the synthesis of a polyester with improved physical properties, and as a result, found through experimentation that when a catalyst including a zinc compound is used for an esterification reaction, a phosphorus-based stabilizer is added to the reaction solution at the end of the esterification reaction, for example, at the time when the degree of esterification reaches at least 80%, and the resulting esterification reaction product is subjected to polycondensation, which will be described in the following preparation method, a polyester resin can be provided that exhibits excellent physical properties, such as high resistance to heat, chemicals, and impact, and has excellent appearance properties, high transparency, and superior molding characteristics. The present invention has been accomplished on the basis of this finding.

As previously known, isosorbide is a secondary alcohol with low reactivity. Polyester resins using isosorbide have improved physical properties such as good heat resistance, but an excess of isosorbide remains unreacted without participating in an esterification reaction. The presence of unreacted isosorbide greatly deteriorates the mechanical properties, chemical resistance, and appearance properties of the polyester resins as final products.

In contrast, the polyester resin according to the embodiment of the invention is synthesized by the following specific preparation method and includes a controllable amount of isosorbide. Particularly, the polyester resin including a relatively large amount of isosorbide can ensure physical properties, making the polyester resin applicable to commercial products, and can exhibit particularly high transparency.

Excellent appearance properties and high transparency of the polyester resin appear due to a shortened esterification reaction time and a shortened contact time at a high temperature resulting from the use of the esterification reaction catalyst including a zinc compound and the addition of the phosphorus-based stabilizer at the end of the esterification reaction.

Other polyester resins known hitherto have been synthesized by the addition or use of various kinds of additives, dyes, etc. to achieve improved appearance properties or transparency. In contrast, the polyester resin according to the embodiment of the invention can exhibit excellent appearance properties and high transparency, making the polyester resin suitable for commercialization even without using any additional additive or dye.

Specifically, the polyester resin has excellent appearance properties, for example, a Color b of 3 or lower, preferably 1 or lower, indicating high transparency. The Color b value is one determined by the Hunter L, a, b scale.

In the course of the synthesis of the polyester resin, a relatively small amount of the raw materials remain unreacted without participating in the reaction, and the raw materials react with high efficiency and a high degree of polymerization. Thus, the polyester resin may have an intrinsic viscosity of 0.5 to 1.0 dl/g.

As used herein, the term "moiety" refers to a certain segment or unit that is included in a product and derived from a specific compound when the specific compound participates in a chemical reaction to form the product. For example, moieties of the dicarboxylic acid components and the moieties of the diol components refer to segments derived from the dicarboxylic acid components and segments derived from the diol components in the polyester formed by an esterification or polycondensation reaction, respectively.

The term "dicarboxylic acid components" is intended to include dicarboxylic acids such as terephthalic acid, alkyl esters thereof (including $C_1$-$C_4$ lower alkyl esters such as monomethyl, monoethyl, dimethyl, diethyl, or dibutyl esters), and/or acid anhydrides thereof. The dicarboxylic acids may react with the diol components to form dicarboxylic acid moieties such as terephthaloyl moieties.

The use of terephthalic acid as one of the dicarboxylic acid components in the synthesis of the polyester can contribute to improvements in the physical properties, such as heat resistance, chemical resistance, or weather resistance (for example, prevention of molecular weight reduction or yellowing caused by UV) of the polyester resin.

The dicarboxylic acid components may further include aromatic dicarboxylic acid components, aliphatic dicarboxylic acid components, or mixtures thereof as other dicarboxylic acid components. The term "other dicarboxylic acid components" means dicarboxylic acid components other than terephthalic acid.

The aromatic dicarboxylic acid components may be $C_8$-$C_{20}$, preferably $C_8$-$C_{14}$, aromatic dicarboxylic acids, or mixtures thereof. Specific examples of the aromatic dicarboxylic acid components include, but are not limited to, isophthalic acid, naphthalenedicarboxylic acids such as 2,6-naphthalenedicarboxylic acid, diphenyl dicarboxylic acids, 4,4'-stilbenedicarboxylic acid, 2,5-furandicarboxylic acid, and 2,5-thiophenedicarboxylic acid.

The aliphatic dicarboxylic acid components may be $C_4$-$C_{20}$, preferably $C_4$-$C_{12}$, aliphatic dicarboxylic acid components, or mixtures thereof. Specific examples of the aliphatic dicarboxylic acids include, but are not limited to, cyclohexanedicarboxylic acids such as 1,4-cyclohexanedicarboxylic acid and 1,3-cyclohexanedicarboxylic acid, and linear, branched, or cyclic aliphatic dicarboxylic acid components such as phthalic acid, sebacic acid, succinic acid, isodecylsuccinic acid, maleic acid, fumaric acid, adipic acid, glutaric acid, and azelaic acid.

The dicarboxylic acid components may include: 50 to 100 mole %, preferably 70 to 100 mole %, of terephthalic acid; and 0 to 50 mole %, preferably 0 to 30 mole %, of at least one dicarboxylic acid selected from the group consisting of aromatic dicarboxylic acids and aliphatic dicarboxylic acids. If the content of terephthalic acid in the dicarboxylic acid components is outside the range defined above, the physical properties (such as heat resistance, chemical resistance, or weather resistance) of the polyester resin may be deteriorated.

The diol components used in the synthesis of the polyester may include 5 to 60 mole % of isosorbide, 10 to 80 mole % of a cyclohexanedimethanol, and the balance of other diol compounds.

The use of the isosorbide (1,4:3,6-dianhydroglucitol) in the diol components contributes to improvements in the physical properties (for example, heat resistance and chemical resistance) of the polyester resin. As the content of the cyclohexanedimethanol (for example, 1,2-cyclohexanedimethanol, 1,3-cyclohexanedimethanol, or 1,4-cyclohexanedimethanol) in the diol components increases, the impact resistance strength of the polyester resin may be remarkably increased.

The diol components may further include diol components other than the isosorbide and cyclohexanedimethanol. The term "other diol components" refers to diol components other than the isosorbide and cyclohexanedimethanol, and may be, for example, aliphatic diols, aromatic diols, or mixtures thereof.

The aromatic diols may include $C_8$-$C_{40}$, preferably $C_8$-$C_{33}$, aromatic diol compounds. Specific examples of the aromatic diol compounds include, but are not limited to, ethylene oxides such as polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene- (2.0)-2,2-bis(4-hydroxyphenyl)propane, polyoxyethylene-(2.3)-2,2-bis(4-hydroxyphenyl)propane, polyoxypropylene-(6)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, polyoxyethylene-(3.0)-2,2-bis(4-hydroxyphenyl)propane, and polyoxyethylene-(6)-2,2-bis(4-hydroxyphenyl)propane, and/or propylene oxide addition bisphenol A derivatives (polyoxyethylene-(n)-2,2-bis(4-hydroxyphenyl)propane, polyoxypropylene-(n)-2,2-bis(4-hydroxyphenyl)propane, or polyoxypropylene-(n)-polyoxyethylene-(n)-2,2-bis(4-hydroxyphenyl)propane). Here, n means the number of the polyoxyethylene or polyoxypropylene units.

The aliphatic diols may include $C_2$-$C_{20}$, preferably $C_2$-$C_{12}$, aliphatic diol compounds. Specific examples of the aliphatic diol compounds include, but are not limited to, linear, branched, or cyclic aliphatic diol components such as ethylene glycol, diethylene glycol, triethylene glycol, propanediols (e.g., 1,2-propanediol and 1,3-propanediol), 1,4-butanediol, pentanediols, hexanediols (e.g., 1,6-hexanediol), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, 1,4-cyclohexanedimethanol, and tetramethylcyclobutanediol.

As described above, the diol components of the polyester resin may include 5 to 60 mole %, preferably 8 to 45 mole %, of isosorbide. If the content of isosorbide in the diol components is less than 5 mole %, the heat resistance or chemical resistance of the polyester resin may be insufficient and the melt viscosity characteristics of the polyester resin may not be exhibited. Meanwhile, if the content of isosorbide exceeds 60 mole %, the appearance properties of the polyester resin or products may be deteriorated or yellowing may occur.

A phosphorus-based stabilizer may be used in the course of the synthesis of the polyester resin. The polyester resin may contain 10 ppm to 300 ppm, preferably 20 ppm to 200 ppm, of the phosphorus-based stabilizer. Specific examples of such phosphorus-based stabilizers include phosphoric acid, trimethyl phosphate, triethyl phosphate, triphenyl phosphate, and triethyl phosphonoacetate. These phosphorus-based stabilizers may be used alone or as a mixture of two or more thereof.

The polyester resin may include 1 to 100 ppm of a zinc-based catalyst, in terms of the central metal atom content, based on the total amount of the resin. Specific examples of such zinc-based catalysts include zinc acetate, zinc acetate dihydrate, zinc chloride, zinc sulfate, zinc sulfide, zinc carbonate, zinc citrate, and zinc gluconate. These zinc-based catalysts may be used alone or as a mixture thereof.

In the course of the synthesis of the polyester resin, a polycondensation catalyst including a titanium compound, a germanium compound, an antimony compound, an aluminum compound, a tin compound, or a mixture thereof may be used in the polycondensation reaction. The polyester resin may include 1 to 100 ppm of the polycondensation catalyst, in terms of the central metal atom content, based on the total amount of the resin.

As the titanium compound, there may be exemplified tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetyl acetonate titanate, ethyl acetoacetate titanate, isostearoyl titanate, titanium dioxide, a titanium dioxide/silicon dioxide copolymer, and a titanium dioxide/zirconium dioxide copolymer.

As the germanium compound, there may be exemplified germanium dioxide ($GeO_2$), germanium tetrachloride ($GeCl_4$), germanium ethylene glycoxide, germanium acetate, a copolymer thereof, and mixtures thereof. Germanium dioxide is preferably used. Crystalline or amorphous germanium dioxide or glycol soluble germanium dioxide may also be used.

According to a further embodiment of the invention, a method for preparing the polyester resin may include: esterifying diol components including 5 to 60 mole % of isosorbide, 10 to 80 mole % of a cyclohexanedimethanol, and the balance of other diol compounds, with dicarboxylic acid components including terephthalic acid in the presence of an esterification reaction catalyst including a zinc compound; adding a phosphorus-based stabilizer to the esterification reaction mixture at the time when the degree of esterification reaches at least 80%; and subjecting the esterification reaction product to polycondensation.

According to the method for preparing the polyester resin, a catalyst including a zinc compound is used for an esterification reaction, a phosphorus-based stabilizer is added to the reaction solution at the end of the esterification reaction, for example, at the time when the degree of esterification reaches at least 80%, and the resulting esterification reaction product is subjected to polycondensation. The polyester resin thus prepared exhibits excellent physical properties, such as high resistance to heat, chemicals, and impact, and has excellent appearance properties, high transparency, and superior molding characteristics.

The use of the esterification reaction catalyst including a zinc compound and the addition of the phosphorus-based stabilizer at the end of the esterification reaction enables completion of the esterification reaction in a relatively short time, specifically in 600 minutes, preferably 200 to 300 minutes.

The shortened esterification reaction time shortens the contact time at a high temperature, contributing to an improvement in the color of the polyester resin. The shortened reaction time is also advantageous in terms of energy consumption reduction. Thus, the polyester resin provided by the preparation method can exhibit excellent appearance properties and high transparency, making the polyester resin suitable for commercialization even without using any additional additive or dye.

Specifically, the polyester resin provided by the preparation method has excellent appearance properties, for example, a Color b of 3 or lower, preferably 1 or lower, indicating high transparency. The Color b value is one determined by the Hunter L, a, b scale.

In the method for preparing the polyester resin, the amount of the diol components or dicarboxylic acid components remaining unreacted without participating in the esterification reaction may be less than 20%. This high reaction efficiency appears to be because the zinc-based catalyst is used and the phosphorus-based stabilizer is added at a predetermined time point. Thus, in the method for preparing the polyester resin, since most of the diol components or the dicarboxylic acid components as raw materials participate in the reaction, the amount of the materials remaining unreacted is relatively small. The polyester resin thus synthesized has excellent physical properties described above and can be easily applied to commercial products.

Details of the dicarboxylic acid components including terephthalic acid, cyclohexanedimethanol, isosorbide, and other diol compounds are the same as described above.

In the esterification reaction, oligomers may be formed by the reaction of the dicarboxylic acid components with the diol components. In the method for preparing the polyester resin, the use of the zinc-based catalyst and the addition of the phosphorus-based stabilizer at a predetermined time point enable the formation of oligomers whose physical properties and molecular weight are optimized, with high efficiency.

The esterification reaction between the dicarboxylic acid components and the diol components may be carried out at a pressure of 0 to 10.0 kg/cm$^2$ and a temperature of 150 to 300° C. The esterification reaction conditions may be appropriately varied depending on specific characteristics of the final polyester, the molar ratio between the dicarboxylic acid components and glycol, or processing conditions. Exemplary conditions for the esterification reaction include a pressure of 0 to 5.0 kg/cm$^2$, preferably 0.1 to 3.0 kg/cm$^2$, and a temperature of 200 to 270° C., preferably 240 to 260° C.

The esterification reaction may be carried out in a batch or continuous manner. The raw materials may be separately added, but the addition of a slurry of the diol components and the dicarboxylic acid components is preferred. The slurry may be prepared by dissolving the diol components including isosorbide in the form of a solid at room temperature in water or ethylene glycol, and mixing the solution with the dicarboxylic acid components including terephthalic acid. Alternatively, the slurry may be prepared by melting isosorbide at 60° C. or higher, and mixing the molten isosorbide with the dicarboxylic acid components including terephthalic acid and the other diol components. Water may be further added to the slurry of the dicarboxylic acid components and the copolymerized diol components of isosorbide, ethylene glycol, and the others. The water addition assists in enhancing the flowability of the slurry.

The molar ratio between the dicarboxylic acid components and the diol components participating in the esterification reaction may be from 1:1.05 to 1:3.0. If the amount of the diol components is less than the lower limit (i.e. 1:1.05), the dicarboxylic acid components may remain unreacted after polymerization, causing poor transparency of the resin. Meanwhile, if the amount of the diol components exceeds the upper limit (i.e. 1:3.0), the polymerization rate may be lowered or the productivity of the resin may be deteriorated.

In the method for preparing the polyester resin, a phosphorus-based stabilizer may be added at the end of the first and second esterification reactions, for example, at the time when each of the degrees of esterification reaches at least 80%. The degree of esterification of at least 80% means that at least 80% of the dicarboxylic acid components are reacted. The degree of esterification can be measured by analyzing the content of the terminal carboxylic acid groups of the dicarboxylic acid components.

The phosphorus-based stabilizer may be used in an amount of 10 ppm to 300 ppm, preferably 20 ppm to 200 ppm, based on the weight of the resin. Specific examples of such phosphorus-based stabilizers are the same as those described above.

The esterification reaction may be carried out in the presence of an esterification reaction catalyst including a zinc compound. The catalyst may be used in an amount of 1 to 100 ppm, in terms of the central metal atom content, based on the amount of the polyester resin. Specific examples of such zinc-based catalysts include zinc acetate, zinc acetate dihydrate, zinc chloride, zinc sulfate, zinc sulfide, zinc carbonate, zinc citrate, and zinc gluconate. These zinc-based catalysts may be used alone or as a mixture thereof. If the content of the zinc-based catalyst is less than the lower limit, it may be difficult to markedly improve the efficiency of the esterification reaction and the amount of the reactants that do not participate in the reaction may be considerably increased. Meanwhile, if the content of the zinc-based catalyst exceeds the upper limit, the appearance properties of the polyester resin may be deteriorated.

The polycondensation reaction may include allowing the esterification reaction product of the dicarboxylic acid components and the diol components to react at a temperature of 150 to 300° C. and a reduced pressure of 600 to 0.01 mmHg for 1 to 24 hours.

The polycondensation reaction may be carried out at a temperature of 150 to 300° C., preferably 200 to 290° C., and more preferably 260 to 280° C., and a reduced pressure of 600 to 0.01 mmHg, preferably 200 to 0.05 mmHg, and more preferably 100 to 0.1 mmHg. The reduced pressure condition of the polycondensation reaction enables the removal of glycol, a by-product of the polycondensation reaction, from the system. If the polycondensation reaction is carried out outside the reduced pressure range defined above (400 to 0.01 mmHg), removal of the by-product may be insufficient.

If the polycondensation reaction is carried out at a temperature lower than 150° C., glycol, a by-product of the polycondensation reaction, cannot be effectively removed from the system, and as a result, the intrinsic viscosity of the final reaction product may be lowered, which deteriorates the physical properties of the polyester resin. Meanwhile, if the reaction is carried out at a temperature higher than 300° C., there is a high possibility that the polyester resin may be yellowed in appearance. The polycondensation reaction may be carried out for a time necessary for the intrinsic viscosity of the final reaction product to reach an appropriate level, for example, for an average retention time of 1 to 24 hours.

The method for preparing the polyester resin may further include adding a polycondensation catalyst. The polycondensation catalyst may be added to the esterification or transesterification reaction product before initiation of the polycondensation reaction. Alternatively, the polycondensation catalyst may be added to a slurry including the diol components and the dicarboxylic acid components before or during the esterification reaction.

As the polycondensation catalyst, a titanium compound, a germanium compound, an antimony compound, an aluminum compound, a tin compound, or a mixture thereof may be used. Examples of the titanium compound and the germanium compound are the same as those described above.

Advantageous Effect of the Invention

The polyester resin of the present invention exhibits excellent physical properties such as high resistance to heat, chemicals, and impact, and has excellent appearance properties, high transparency, and superior molding characteristics. The method of the present invention is suitable for preparing the polyester resin.

DETAILS FOR PRACTICING THE INVENTION

The invention will be explained in more detail with reference to the following examples. However, these examples are provided for illustrative purposes and are not intended to limit the scope of the present invention.

Examples 1-4

Preparation of Polyester Resins

The reactants and zinc acetate (an esterification reaction catalyst) in the amounts shown in Table 1 were mixed in a 7 L reactor. The mixture was subjected to esterification (ES) at a pressure of 2.0 kg/cm² and a temperature of 255° C. for the reaction time shown in Table 1.

150 ppm of triethyl phosphate as a phosphate stabilizer was added to the esterification reaction product at the time when the degree of esterification reached at least 80%.

When 80-99% of water as a by-product was discharged from the system after completion of the esterification reaction, a germanium catalyst was added in an amount of 200 ppm (in terms of the central element content) with respect to the total weight of the reactants. Thereafter, a polycondensation reaction was carried out at a pressure of 0.5 mmHg and a temperature of 275° C. The reaction was continued until the viscosity reached a desired level, affording a polyester resin.

Comparative Examples 1-3

Preparation of Polyester Resins

Comparative Examples 1-2

Polyester resins were prepared in the same manner as in Examples 1-4, except that the compositions of the reactants were changed as shown in Table 2 and the phosphorus-based stabilizer was added at the initial stage of the esterification reaction.

Comparative Example 3

A polyester resin was prepared in the same manner as in Examples 1-4, except that the composition of the reactants was changed as shown in Table 2 and the zinc-based catalyst was not used.

Experimental Examples 1-2

Measurements of Physical Properties of Polyester Resins Prepared in Examples 1-4 and Comparative Examples 1-3

The physical properties of the polyester resins prepared in Examples 1-4 and Comparative Examples 1-3 were measured by the following methods. The results are shown in Tables 1 and 2.

Experimental Example 1

Measurement of Intrinsic Viscosity (IV)

Each of the polymers was dissolved in ortho-chlorophenol (OCP) at 150° C. The concentration of the polymer was adjusted to 0.12%. The measurement was done using an Ubbelohde viscometer in a thermostatic bath at 35° C.

Experimental Example 2

Measurement of Heat Resistance (Tg)

Each of the polyester resins was annealed at 300° C. for 5 min, cooled to room temperature, and heated at a rate of 10° C./min ($2^{nd}$ scan). The glass-rubber transition temperature (Tg) of the resin was measured during the $2^{nd}$ scan.

The compositions of the resins of Examples 1-4 and Comparative Examples 1-3, and the experimental results, are shown in Tables 1 and 2.

TABLE 1

Compositions of the resins of Examples 1-4 and results of Experimental Examples 1-2

| Components | | Example 1 | Example 2 | Example 3 | Example 4 |
|---|---|---|---|---|---|
| Diacid components | TPA (wt %) | 100 | 100 | 100 | 80 |
| | AA (wt %) | — | — | — | 20 |
| | CHDA (wt %) | — | — | — | — |
| Diol components | ISB (wt %) | 11 | 21 | 2 | 26 |
| | CHDM (wt %) | 54 | 56 | 42 | 0 |
| | EG (wt %) | 35 | 23 | 26 | 74 |
| | BPA-EO (wt %) | 0 | 0 | 0 | 30 |
| ES reaction catalyst | Zn (ppm) | 10 | 30 | 50 | 20 |
| Time for stabilizer addition | Initial stage/ end of ES | End | End | End | End |
| Experimental results | Reaction rate of monomers (%) | 91 | 92 | 88 | 85 |
| | ES reaction time (min) | 259 | 247 | 237 | 274 |
| | IV (dl/g) | 0.75 | 0.75 | 0.65 | 0.8 |
| | Heat resistance (Tg) | 90 | 92 | 121 | 104 |
| | Color b | 0 | −2 | 3 | 1 |

TABLE 2

Compositions of the resins of Comparative Examples 1-3 and results of Experimental Examples 1-2

| Components | | Comparative Example 1 | Comparative Example 2 | Comparative Example 3 |
|---|---|---|---|---|
| Diacid components | TPA (wt %) | 100 | 100 | 100 |
| | AA (wt %) | — | — | — |
| | CHDA (wt %) | — | — | — |
| Diol components | ISB (wt %) | 8 | 1 | 39 |
| | CHDM (wt %) | 55 | 56 | 22 |
| | EG (wt %) | 37 | 23 | 39 |
| | BPA-EO (wt %) | 0 | 0 | 0 |
| ES reaction catalyst | Zn (ppm) | 10 | 30 | 0 |
| Time for stabilizer addition | Initial stage/ end of ES | Initial stage | Initial stage | — |
| Experimental results | Reaction rate of monomers (%) | 72 | 79 | 92 |
| | ES reaction time (min) | 235 | 241 | 384 |
| | IV (dl/g) | 0.7 | 0.7 | 0.7 |
| | Heat resistance (Tg) | 108 | 106 | 108 |
| | Color b | 3 | 4 | 6 |

As can be seen from the results in Tables 1-2, the esterification reactions were completed within 280 min in Examples 1-4 and the reaction rates of the monomers were 85% or higher, indicating high reactivity. Each of the polyester resins of Examples 1-4 was confirmed to have a Color b of 3 or lower.

In contrast, the reaction rates of the monomers were lower than 80% in the polyester resins of Comparative Examples 1-2, which used the zinc ES reaction catalyst, but were synthesized by adding the phosphorus-based stabilizer at the initial stage of the esterification reaction.

In the polyester resin of Comparative Example 3 using no zinc ES reaction catalyst and no phosphorus-based stabilizer, the reaction time was greatly extended, and as a result, the reaction rate of the monomers was raised to a level comparable to the reaction times in Examples 1-4. However, the appearance properties of the polyester resin of Comparative Example 3 were drastically deteriorated. The polyester resin of Comparative Example 3 was confirmed to have a Color b value of 6.

What is claimed is:

1. A polyester resin comprising:
   moieties of dicarboxylic acid components comprising terephthalic acid; and
   moieties of diol components comprising 5 to 60 mole % of isosorbide, 10 to 80 mole % of a cyclohexanedimethanol, and the balance of other diol compounds,
   wherein the polyester resin contains 1 to 100 ppm of a zinc-based catalyst, in terms of the central metal atom content, based on the total amount of the resin, and 10 ppm to 300 ppm of a phosphorus-based stabilizer, and the polyester resin has a Color b value of 3 or lower.

2. The polyester resin according to claim 1,
   wherein the other diol compounds comprise at least one compound selected from the group consisting of aliphatic diol compounds and aromatic diol compounds.

3. The polyester resin according to claim 1,
   wherein the phosphorus-based stabilizer comprises at least one compound selected from the group consisting of phosphoric acid, trimethyl phosphate, triethyl phosphate, triphenyl phosphate, and triethyl phosphonoacetate.

4. The polyester resin according to claim 1,
   wherein the zinc-based catalyst comprises at least one zinc compound selected from the group consisting of zinc acetate, zinc acetate dihydrate, zinc chloride, zinc sulfate, zinc sulfide, zinc carbonate, zinc citrate, and zinc gluconate.

5. The polyester resin according to claim 1,
   further comprising 1 to 100 ppm of at least one polycondensation reaction catalyst selected from the group consisting of titanium compounds, germanium compounds, antimony compounds, aluminum compounds, and tin compounds, based on the total amount of the resin.

6. A method for preparing the polyester resin according to claim 1, the method comprising:
   esterifying diol components comprising 5 to 60 mole % of isosorbide, 10 to 80 mole % of a cyclohexanedimethanol, and the balance of other diol compounds, with dicarboxylic acid components comprising terephthalic acid, in the presence of an esterification reaction catalyst comprising a zinc compound;
   adding a phosphorus-based stabilizer to the esterification reaction mixture at a time when the degree of esterification reaches at least 80%; and
   subjecting the esterification reaction product to polycondensation,
   wherein the amount of the diol components or dicarboxylic acid components remaining unreacted without participating in the esterification reaction is less than 20%.

7. The method according to claim 6,
   wherein a molar ratio between the dicarboxylic acid components and the diol components participating in the esterification reaction is from 1:1.05 to 1:3.0.

8. The method according to claim 6,
   wherein the phosphorus-based stabilizer is used in an amount of 10 ppm to 300 ppm, based on the weight of the resin.

9. The method according to claim 6,
   wherein the zinc-based catalyst is used in an amount of 1 to 100 ppm, in terms of the central metal atom content, based on the weight of the resin.

10. The method according to claim 6,
    wherein the esterification reaction is carried out at a pressure of 0 to 10.0 kg/cm2 and a temperature of 150 to 300° C.

11. The method according to claim 6,
    wherein the esterification reaction time is 600 minutes or less.

12. The method according to claim 6,
    wherein the esterification reaction is carried out for 200 to 300 minutes.

13. The method according to claim 6,
    wherein the polycondensation reaction of the esterification reaction product is carried out at a temperature of 150 to 300° C. and a reduced pressure of 600 to 0.01 mmHg for 1 to 24 hours.

14. The method according to claim 6,
    further comprising adding at least one catalyst compound selected from the group consisting of titanium compounds, germanium compounds, antimony compounds, aluminum compounds, and tin compounds.

* * * * *